(12) United States Patent
Chekurov

(10) Patent No.: US 10,943,756 B2
(45) Date of Patent: Mar. 9, 2021

(54) RADIATION WINDOW

(71) Applicant: Oxford Instruments Technologies Oy, Espoo (FI)

(72) Inventor: Nikolai Chekurov, Helsinki (FI)

(73) Assignee: Oxford Instruments Technologies Oy, Espoo (FI)

( * ) Notice: Subject to any disclaimer, the term of this patent is extended or adjusted under 35 U.S.C. 154(b) by 0 days.

(21) Appl. No.: 16/478,134

(22) PCT Filed: Jan. 17, 2018

(86) PCT No.: PCT/FI2018/050034
§ 371 (c)(1),
(2) Date: Jul. 16, 2019

(87) PCT Pub. No.: WO2018/134480
PCT Pub. Date: Jul. 26, 2018

(65) Prior Publication Data
US 2019/0355539 A1    Nov. 21, 2019

(30) Foreign Application Priority Data
Jan. 18, 2017  (FI) .................................... 20175037

(51) Int. Cl.
*H05G 1/00* (2006.01)
*H01J 5/18* (2006.01)
*G01T 7/00* (2006.01)

(52) U.S. Cl.
CPC . *H01J 5/18* (2013.01); *G01T 7/00* (2013.01)

(58) Field of Classification Search
CPC . H01J 5/18; H01J 35/18; H01J 47/004; G01T 7/00; B32B 38/10; H01L 21/02104; H01L 31/085
See application file for complete search history.

(56) References Cited

U.S. PATENT DOCUMENTS

| | | | |
|---|---|---|---|
| 6,870,174 B2 | 3/2005 | Yamaguchi et al. | |
| 7,618,906 B2* | 11/2009 | Meilahti | H01J 5/18 378/140 |
| 9,607,723 B2* | 3/2017 | Sipila | H01L 31/028 |
| 2011/0311029 A1* | 12/2011 | Andersson | H01J 35/18 378/161 |
| 2012/0025110 A1 | 2/2012 | Davis et al. | |
| 2015/0053640 A1 | 2/2015 | Kostamo et al. | |
| 2015/0235726 A1 | 8/2015 | Ohashi et al. | |
| 2017/0154749 A1* | 6/2017 | Torma | C23C 16/32 |
| 2018/0061608 A1* | 3/2018 | Alivov | H01J 5/18 |

FOREIGN PATENT DOCUMENTS

| | | |
|---|---|---|
| DE | 102014103546 A1 | 8/2015 |
| EP | 0476827 A1 | 3/1992 |
| EP | 2817818 A1 | 12/2014 |
| JP | 3731251 B2 | 1/2006 |
| WO | WO2013121078 A1 | 8/2013 |

* cited by examiner

*Primary Examiner* — Kiho Kim
(74) *Attorney, Agent, or Firm* — Laine IP Oy

(57) ABSTRACT

According to an example aspect of the present invention, there is provided a method comprising obtaining a first silicon wafer comprising a mask on a first side, attaching a second silicon wafer on the first side of the first silicon wafer, and etching one of the wafers to partially expose a window layer deposited on the opposite silicon wafer and to leave a structure defined by the mask supporting the window layer.

22 Claims, 7 Drawing Sheets

| Obtaining a first silion wafer comprising a silicon oxide layer thereon, the silicon oxide layer comprising a cavity | 710 |

| Attaching a second silicon wafer on the first silicon wafer, the second silicon wafer having a silicon nitride layer deposited thereon, the silicon nitride layer thereby being inserted into the cavity | 720 |

| Etching through the first silicon wafer to expose the silicon nitride layer, and etching through the second silicon wafer in accordance with a mask, to construct a support structure for the silicon nitride layer | 730 |

FIGURE 7

RADIATION WINDOW

FIELD

The present invention relates to window structures that are at least partially transparent to radiation, such as x-rays.

BACKGROUND

Radiation measurement devices operate by determining a reaction of a detector device to incoming radiation. For example, an x-ray camera may receive x-rays and determine their intensity as a function of location on a two-dimensional charge-coupled device, CCD, array. A spectrometer, on the other hand, may be configured to determine spectral characteristics of incoming radiation, for example to determine an astrophysical redshift or to identify characteristic emission peaks of elements to analyse elemental composition of a sample.

When measuring soft x-rays, by which it may be meant, for example, x-rays with energy below about 1 keV, providing the radiation to a detector presents with challenges. For example, air scatters soft x-rays and many materials absorb soft x-rays, wherefore the radiation most conveniently is conveyed to a detector through vacuum, wherein the detector may be placed in the vacuum.

When operating in atmospheric circumstances, a suitable window may be arranged to admit soft x-rays into the vacuum where a detector may be arranged to analyse the radiation. Such a window would ideally be transparent to the soft x-rays and durable of construction, and impermeable to air to protect a detector unit.

Transparency may be increased by reducing the thickness of the window. For example, beryllium windows have been used, wherein the thinner the window is, the larger a fraction of incoming radiation is admitted through the window. On the other hand, the thinner the window is, the likelier it is to break in real-life circumstances.

To increase durability of a window, the window may be supported with a mechanical grid or it may be sandwiched between supporting structures. Supporting structures may take the form of web-like support structures, which partially cover and partially expose the window material. In parts where the window material is exposed by supporting structures, the window is maximally transparent to incoming radiation.

SUMMARY OF THE INVENTION

The invention is defined by the features of the independent claims. Some specific embodiments are defined in the dependent claims.

According to a first aspect of the present invention, there is provided a method comprising obtaining a first silicon wafer comprising a mask on a first side, attaching a second silicon wafer on the first side of the first silicon wafer, and etching one of the wafers to partially expose a window layer deposited on the opposite silicon wafer and to leave a structure defined by the mask supporting the window layer.

Various embodiments of the first aspect may comprise at least one feature from the following bulleted list:

- the window layer is deposited on a non-attached side of one of the silicon wafers
- the structure is formed of silicon of one of the silicon wafers
- the window layer is deposited on a non-attached side of the second silicon wafer
- the structure is formed of silicon of the second silicon wafer
- the method further comprises removing the mask, at least partly
- the method further comprises depositing at least one surface layer on a side of the window layer that does not face the structure
- the at least one surface layer comprises an aluminium layer
- the at least one surface layer comprises a graphene layer
- before attaching the second silicon wafer, part of the silicon of the first silicon wafer is etched from the first side in accordance with the mask
- an etch stop layer is provided between the window layer and the second silicon wafer
- the etch stop layer is removed at least in part
- a third silicon wafer is provided, attached to the window layer, wherein a second mask is provided on the third silicon wafer, and wherein the third silicon wafer is etched in accordance with the second mask to produce a second structure on the window layer.

According to a second aspect of the present invention, there is provided a radiation window structure, comprising a continuous window layer on a supporting structure, the supporting structure on a first but not a second side of the window layer, and wherein the window layer is continuously exposed on the second side and wherein the window layer is partially exposed the first side.

Various embodiments of the second aspect may comprise at least one feature from the following bulleted list:

- the window layer is provided with at least one surface layer on the second side
- the at least one surface layer comprises an aluminium layer
- the at least one surface layer comprises a graphene layer
- the supporting structure is comprised of silicon
- the window layer is comprised of at least one material from the following list: silicon nitride, Al2O3, AlN, SiO2, SiC, TiO2, TiN, metallo-carbo-nitrides, graphene, pyrolytic carbon and polymer
- the window layer lies in a single plane.

According to a third aspect of the present invention, there is provided a method comprising obtaining a first silicon wafer comprising a silicon oxide layer thereon, the silicon oxide layer comprising a cavity, attaching a second silicon wafer on the first silicon wafer, the second silicon wafer having a window layer deposited thereon, the window layer thereby being inserted into the cavity, and etching through the first silicon wafer to expose the window layer, and etching through the second silicon wafer in accordance with a mask, to construct a support structure for the window layer.

Various embodiments of the third aspect may comprise at least one feature from the following bulleted list:

- the second silicon wafer partly exposes the window layer
- method further comprises depositing a surface layer on a side of the window layer
- the surface layer is deposited on a side of the window layer that does not face the support structure
- the surface layer comprises an aluminium layer
- the surface layer comprises a graphene layer.

According to a fourth aspect of the present invention, there is provided a method comprising obtaining a silicon wafer comprising a buried silicon oxide layer therein, etching from a first side of the silicon wafer using the buried silicon oxide layer as etch stop, depositing a window layer into the silicon wafer into a cavity created by the etching and etching from a second side of the silicon wafer to build a supporting structure on the window layer.

Various embodiments of the fourth aspect may comprise at least one feature from the following bulleted list:

- the window layer is comprised of at least one material from the following list: silicon nitride, Al2O3, AlN, SiO2, TiO2, TiN, metallo-carbo-nitrides, graphene, pyrolytic carbon and polymer
- the method further comprises depositing on the second side of the silicon wafer a layer, and patterning the layer into a mask that defines the shape of the supporting structure
- the layer comprises a silicon nitride layer
- the method further comprises completing the window layer as continuously exposed on the first side and partially exposed on the second side.

BRIEF DESCRIPTION OF THE DRAWINGS

FIG. 7 is a flow graph of a method in accordance with at least some embodiments of the present invention.

EMBODIMENTS

Radiation windows may benefit from layers deposited thereon, to enhance their desired characteristics, which may include gas impermeability, optical properties or spectral selectivity, for example. To facilitate provision of such layers, radiation windows in accordance with at least some embodiments of the present invention are provided with supporting structures enhancing their structural robustness on one side and the layer or layers on the other side. The side of the radiation window with the layer or layers may be left without a robustness-enhancing supporting structure to facilitate creation of a continuous, high quality layer. Examples of such layers include aluminium, graphene, Al2O3, SiO2, SiC, nitride films such as AN, silicon nitride, BN, TiN, metal-carbo-nitrides such as TiAlCN, pyrolytic carbon, and polymers such as polyimide.

Figure 1:
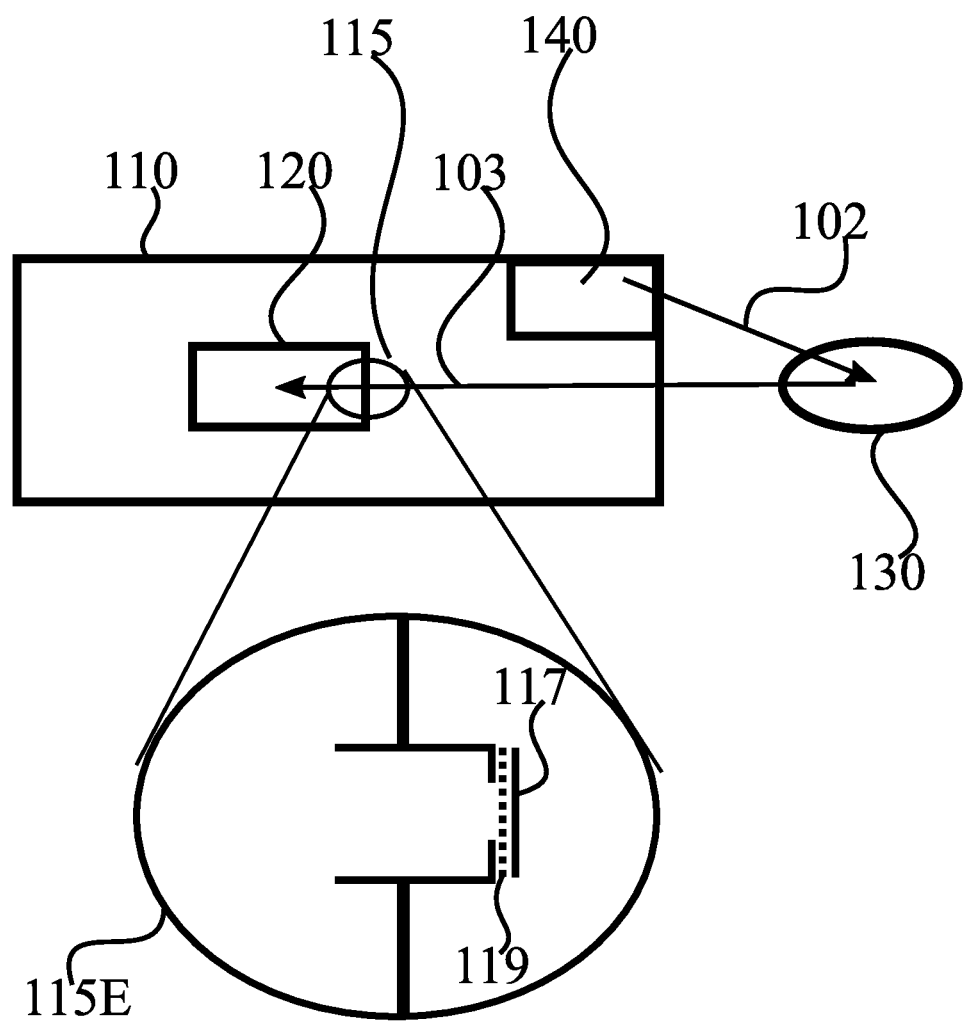
FIG. 1 illustrates an example system capable of being operated with at least some embodiments of the present invention.

FIG. 1 illustrates an example system capable of being operated with at least some embodiments of the present invention. The illustrated system relates to x-ray fluorescence, to which the present invention is not limited, rather, windows built in accordance with the present invention may find application also more broadly.

FIG. 1 illustrates an analytic device 110, which comprises an x-ray detector 120. X-ray detector 120 is in this example configured to determine spectral characteristics of x-rays incident on itself, for example to enable elemental composition analysis based on characteristic emissions.

In use, the arrangement of FIG. 1 irradiates sample 130 with primary x-rays 102 from primary x-ray source 140, stimulating matter comprised in sample 130 to emit, via fluorescence, secondary x-ray radiation 103, spectral characteristics of which are determined, at least partly, in x-ray detector 120.

X-ray detector 120 comprises a window region 115, which is arranged to admit x-rays into X-ray detector 120. Window region 115 is illustrated in an enlarged view 115E at the bottom of FIG. 1, wherein a gap in the outer housing of analytic device 110 is shown. Arranged in the gap is an opening wherein a window layer 117 is disposed, preventing inflow of air from outside analytic device 110 to inside analytic device 110 while allowing x-rays, such as, for example, soft x-rays, to enter analytic device 110, so that these x-rays may be analysed in x-ray detector 120. Window layer 117 may be comprised of silicon nitride, for example. Further examples of materials window layer 117 may be comprised of include Al2O3, AlN, SiO2, SiC, TiO2, silicon nitride, TiN, metallo-carbo-nitrides such as TiAlCN, graphene, pyrolytic carbon and polymers, such as polyimide. In some embodiments, window region 115 may be disposed in the housing of analytic device 110, rather than at X-ray detector 120.

Window layer 117 is supported by supporting structure 119 on one side. While illustrated on the inner side facing the inside of X-ray detector 120, supporting structure 119 may, in other embodiments, alternatively be on the outward facing side. Supporting structure 119 may, in some embodiments, be present on one side but not the other side, in other words, supporting structure 119 may be limited to one side of window layer 117. Supporting structure 119 may be comprised of silicon, for example.

While window layer 117 and supporting structure 119 are illustrated in FIG. 1 as slightly separate, with a gap in between, this is for clarity of illustration purposes. In actual embodiments of the invention, window layer 117 may be attached to supporting structure 119, for example by being deposited on a wafer from which supporting structure 119 is constructed. Supporting structure 119 may be constructed by etching, for example.

Supporting structure 119 may take a form and shape that is suitable for supporting window layer 117 thereon, to withstand atmospheric pressure, for example, in case the inside of x-ray detector 120 is maintained at low pressure, or, indeed, vacuum or near-vacuum. For example, supporting structure 119 may comprise a square or rectangular layout, or a spider-web shape, to provide support for window layer 117 while not obscuring too much of window layer 117.

In general, supporting structure 119, attached to window layer 117, will partially obscure and partially expose window layer 117. In detail, a part of window layer 117 touching support structure 119 will be obscured by it, by which it is meant that x-rays passing through window layer 117 will at these places be partially prevented, by support structure 119, from reaching x-ray detector 120. In parts of window layer 117 not touching support structure 119, x-rays that penetrate window layer 117 may proceed directly to x-ray detector 120. The larger the part of window layer 117 touching, and obscured by, supporting structure 119, the stronger is the support provided to window layer 117 and the larger the effect supporting structure 119 has on x-rays incoming through window layer 117. The strength of supporting structure 119 may thus be seen as a trade-off between transmittance through window layer 117 and strength of the radiation window structure which comprises window layer 117 and supporting structure 119. In general, window layer 117 may be completely exposed on a first side and partly exposed on a second side, the supporting structure being on the second side. By completely exposed, or continuously exposed, it is meant window layer 117 is exposed in a manner that an area of window layer 117 in active use is not obstructed by a support structure on the continuously exposed side.

Window layer 117 may be continuous in nature, by which it is meant the layer is not interrupted, for example, in accordance with the support structure. A continuous layer may be planar in the sense that it lies in a single plane.

Window layer 117 may be thin, in the nanometer range, while extending over an opening which is in the order of a few millimetres, or centimetres, in size.

Window layer 117 may have, for example on a side not facing support structure 119, at least one supplementary layer. Examples of supplementary layers include a thin aluminium layer and a graphene layer. An aluminium layer may block, at least partly, visible light from entering through window layer 117. Graphene, on the other hand, may enhance an ability of window layer 117, for example when made of silicon nitride, to prevent gas molecules, such as air, from penetrating through window layer 117. When one side of window layer 117 is clear from supporting structures, such supplementary layers may be applied easier and the resulting layers have fewer defects. This provides the beneficial technical effect that the layers function better in their respective purposes. Supplementary layers may alternatively be referred to as surface layers.

FIG. 2A-FIG. 2E illustrate an example manufacturing process in accordance with at least some embodiments of the present invention. The process begins at the situation of FIG. 2A, where a silicon wafer 210 is obtained, comprising at least a first silicon oxide layer 214, and, optionally, a second silicon oxide layer 212.

Figure 2A:
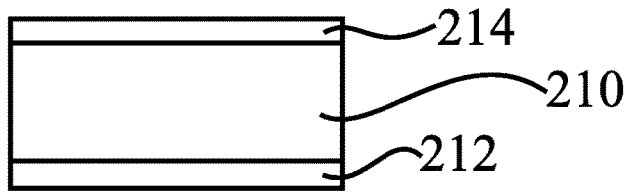
FIG. 2A-FIG. 2E illustrate an example manufacturing process in accordance with at least some embodiments of the present invention.
Figure 2B:
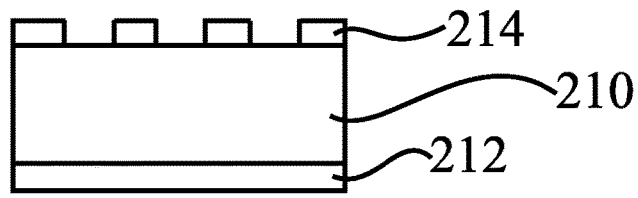

As the process advances to the situation illustrated in FIG. 2B, first silicon oxide layer 214 has been patterned, by removing part thereof, to leave behind a mask that defines a shape of a supporting structure. The pattern need not penetrate all the way through first silicon oxide layer 214. In some embodiments, the silicon wafer is also patterned before oxidation, to generate deeper structures.

Figure 2C:
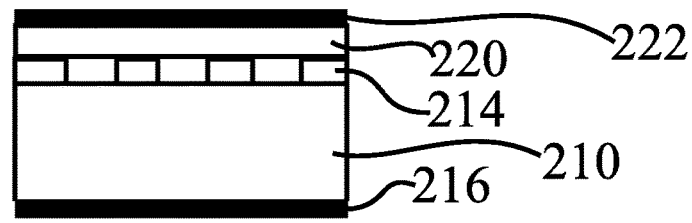

As the process advances to the situation illustrated in FIG. 2C, a second silicon wafer 220 has been attached on top of the mask layer 214. Second silicon wafer 220 has deposited thereon a window layer 222, which may comprise silicon nitride, for example. An optional silicon nitride layer 216 may be deposited on the opposite side of first silicon wafer 210. Where present, second silicon oxide layer 212 may be removed to arrive at the situation illustrated in FIG. 2C.

As a variant of this process, alternatively second silicon wafer 220 may be provided with an oxide layer, which is patterned to form the mask. Then first silicon wafer 210 may be attached onto second silicon wafer 220 to cover the mask. Subsequently, first silicon wafer 210 may be etched, as described below. An advantage of providing the mask on second silicon wafer 220 is that attaching errors will have no effect on etching.

Figure 2D:
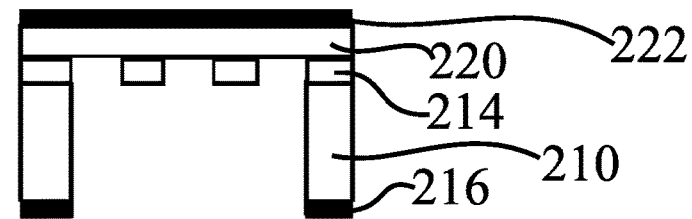

As the process advances to the situation illustrated in FIG. 2D, first silicon wafer 210 has been etched to expose mask 214 and, partially, second silicon wafer 220, masked by mask 214.

Figure 2E:
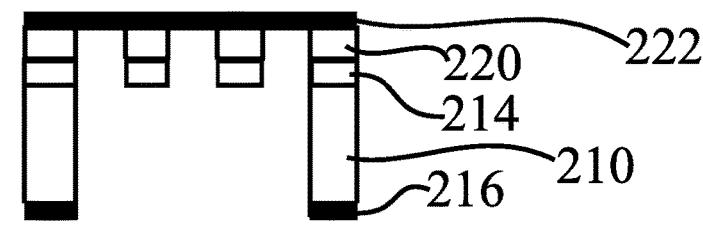

As the process advances to the situation illustrated in FIG. 2E, etching is continued to partially expose window layer 222 from the side of first silicon wafer 210. In the process, a supporting structure is constructed of second silicon wafer 220, which supports window layer 222. Optionally, in a subsequent stage, the exposed silicon oxide from mask 214 may be removed.

Overall, therefore, in the process of FIGS. 2A-2E, the first silicon wafer 210 is provided with mask 214, the second silicon wafer 220 is attached to the first silicon wafer 210 on the first side, leaving mask 214 between these wafers, and then the first silicon wafer 210 and the second silicon wafer 220 are etched from the second side, different from the first side, to partially expose window layer 222. The supporting structure is thereby formed of second silicon wafer 220, on the second side of window layer 222.

As a modification of the process described above, a sacrificial etch stop layer, for example 1 micrometer of PECVD SiO2 or a multilayer structure, may be provided between second silicon wafer 220 and window layer 222, to protect window layer 222, which may be delicate, during chemical and/or mechanical stress during silicon etching phases of the process.

Figure 3A:
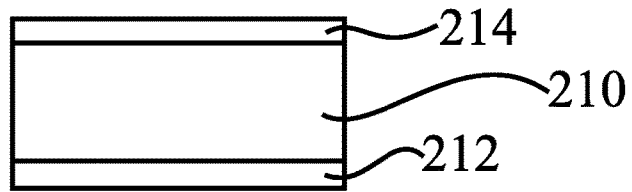
FIG. 3A-FIG. 3E illustrate a variant of the process of FIGS. 2A-2E.

FIG. 3A-FIG. 3E illustrate a variant of the process of FIGS. 2A-2E. Like numbering denotes similar structure. FIG. 3A corresponds to FIG. 2A.

Figure 3B:
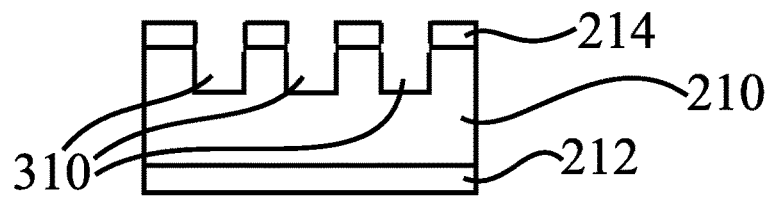
Figure 3C:
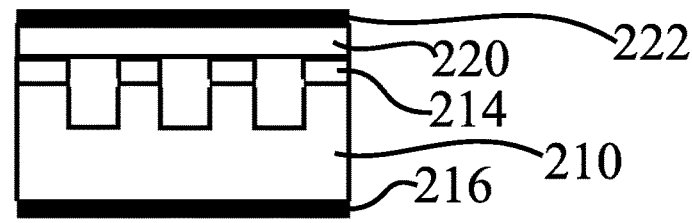

FIG. 3B corresponds to the situation of FIG. 2B, with the exception that first silicon wafer 210 is partly etched, using mask 214, to facilitate the subsequent etching from the other side. The resulting cavities are denoted in FIG. 3B with reference sign 310. As in advancing to the situation illustrated in FIG. 2C, in advancing to the situation illustrated in FIG. 3C a second silicon wafer 220 has been attached on top of the mask layer 214. Second silicon wafer 220 has deposited thereon a window layer 222, which may comprise silicon nitride, for example. An optional silicon nitride layer 216 may be deposited on the opposite side of first silicon wafer 210. Where present, second silicon oxide layer 212 may be removed to arrive at the situation illustrated in FIG. 2C.

Figure 3D:
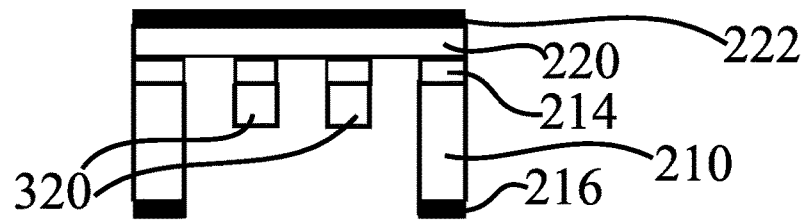
Figure 3E:
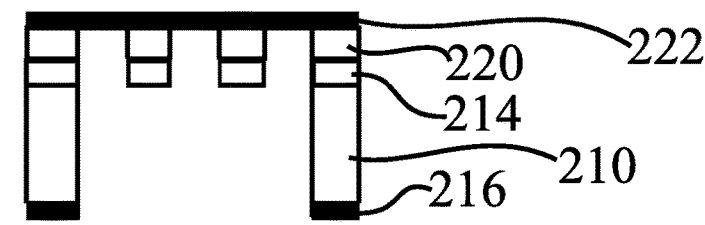

In the phase of FIG. 3D, a quantity of silicon from first silicon wafer 210 remains, covering parts of mask 214. This is due to the cavities 310 created earlier. The remaining silicon is denoted in FIG. 3D with reference sign 320. This silicon may be removed in subsequent phases of the process.

Overall, therefore, in the process of FIGS. 3A-3E, the first silicon wafer 210 is etched from a first side, the second silicon wafer 220 is attached to the first silicon wafer 210 on the first side, leaving mask 214 between these wafers, and then the first silicon wafer 210 and the second silicon wafer 220 are etched from the second side, different from the first side, to partially expose window layer 222. The supporting structure is thereby formed of second silicon wafer 220, on the second side of window layer 222.

As a further modification of the process of FIGS. 2A-2E or FIGS. 3A-3E, a second supporting structure may be constructed on the other side of window layer 222.

While the second supporting structure may make deposition of a further layer on window layer 222 more difficult, having a supporting structure on both sides of window layer 222 results in superior rigidity for the resulting window structure. Such a structure may be constructed as described above in connection with FIGS. 2A-2E or FIGS. 3A-3E, wherein further a third silicon wafer is attached to the other side of window layer 222, the third silicon wafer provided with a silicon oxide layer on top which is patterned to produce a second mask, and subsequently etching to produce the second supporting structure using the second mask and to partially expose window layer 222 also from the top side. The other supporting structure may be produced as described above in connection with FIGS. 2A-2E or FIGS. 3A-3E.

Figure 4A:
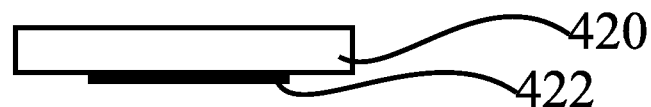
FIG. 4A-FIG. 4E illustrate an example manufacturing process in accordance with at least some embodiments of the present invention.
Figure 4B:
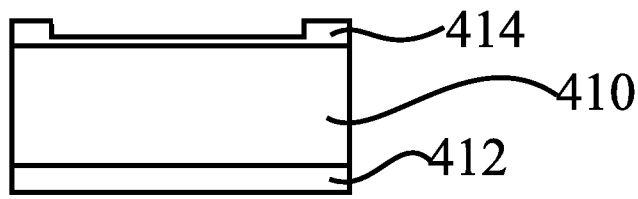

FIG. 4A-FIG. 4E illustrate an example manufacturing process in accordance with at least some embodiments of the present invention. In FIGS. 4A and 4B, a first silicon wafer 410 is furnished with first silicon oxide layer 414 and, optionally, second silicon oxide layer 412. First silicon oxide layer is worked to obtain therein a cavity. Second silicon wafer 420 has deposited thereon a window layer 422, which may comprise silicon nitride, for example.

Figure 4C:
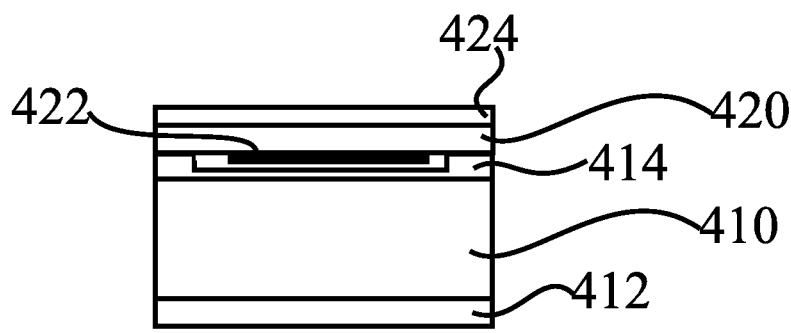

Moving to the situation of FIG. 4C, second silicon wafer 420 has been attached to first silicon wafer 410. This attaching may be based on oxide only, for example. In connection with this attaching, window layer 422 is inserted in the cavity of first silicon oxide layer 414. A gap may be left between window layer 422 and the bottom of the cavity. Further, a top silicon oxide layer 424 is obtained on top of second silicon wafer 420.

Figure 4D:
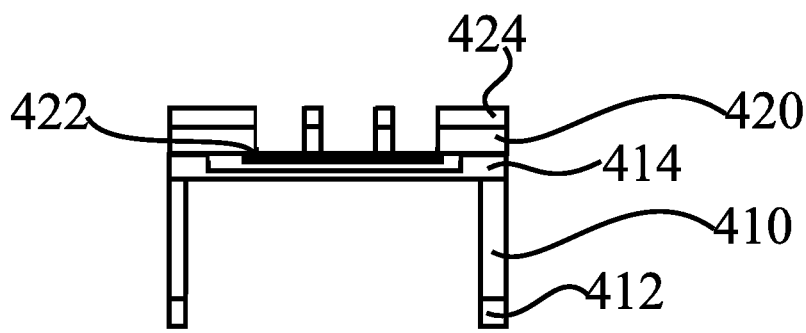

Moving to the situation of FIG. 4D, the top silicon oxide layer 423 is patterned to impart thereon a shape of a support structure, the remaining part of top silicon oxide layer 423 forming a mask. Etching is performed from the top side, to construct on window layer 422 a supporting structure, the shape of which is defined by mask 424. In the process, window layer 422 is partially exposed from the top side, wherein the non-exposed part of window layer 422 is in contact with the support structure. Furthermore, etching is performed from the bottom side to expose first silicon oxide layer 414.

Figure 4E:
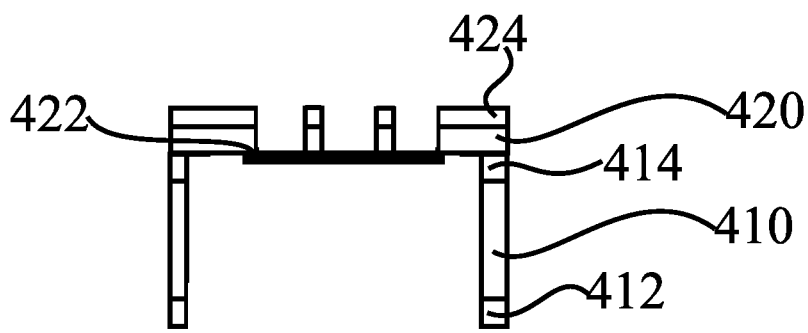

Finally, to obtain the result illustrated in FIG. 4E, first silicon oxide layer 414 is removed to expose window layer 422 from below. As a result, window layer 422 is continuously exposed on the bottom side and supported by the supporting structure on the top side, facilitating application of at least one layer on window layer 422 from the bottom side. Examples of suitable layers include aluminium and graphene, as explained above.

FIG. 5A-FIG. 5E illustrate an example manufacturing process in accordance with at least some embodiments of the present invention.

Figure 5A:
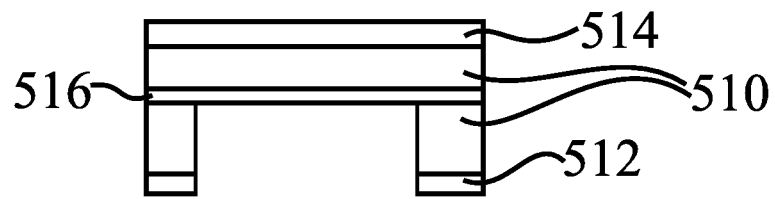
FIG. 5A-FIG. 5E illustrate an example manufacturing process in accordance with at least some embodiments of the present invention.

Starting in the situation illustrated in FIG. 5A, a silicon wafer 510 has been obtained, with a buried silicon oxide layer 516, as well as silicon oxide layers 512 and 514, as illustrated. This may be obtained, for example, by attaching two wafers to each other, such that a silicon oxide layer on one of these wafers is left therein between. Further, silicon wafer 510 has been etched from the bottom side, using buried silicon oxide layer 516 as an etch stop.

Figure 5B:

As the process advances to the situation illustrated in FIG. 5B, buried silicon oxide layer 516 is etched, where exposed. Further, silicon oxide layers 512 and 514 are removed.

Figure 5C:
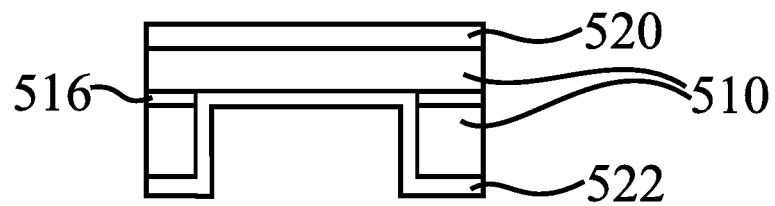

As the process advances to the situation illustrated in FIG. 5C, window/mask layers, for example silicon nitride, are deposited on both sides. Such layers are illustrated as layers 520 and 522.

Figure 5D:
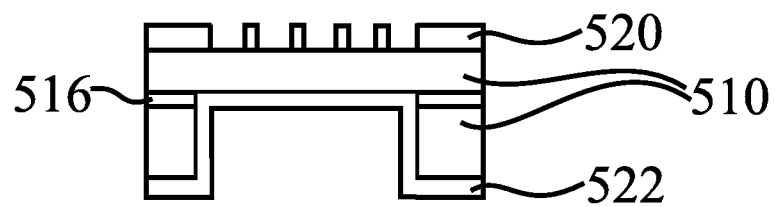

As the process advances to the situation illustrated in FIG. 5D, the top mask layer 520 is patterned in the shape of a supporting structure, such as, for example, a supporting grid or web structure.

Figure 5E:
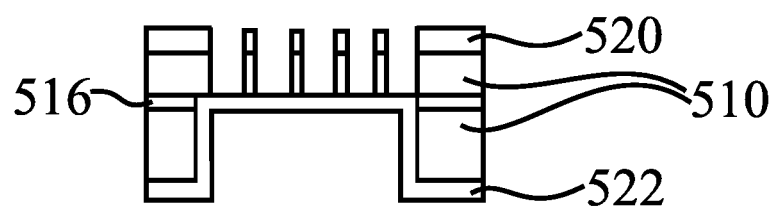

As the process advances to the situation illustrated in FIG. 5E, silicon wafer 510 is etched from the top side to partially expose window layer 522 from the top side. As a result of this etch, the supporting structure is constructed of silicon wafer 510. The mask layer 520 may remain on the supporting structure.

As window layer 522 is continuously exposed from the bottom side, a supplementary layer or layers may be deposited thereon, as described above.

Figure 6:
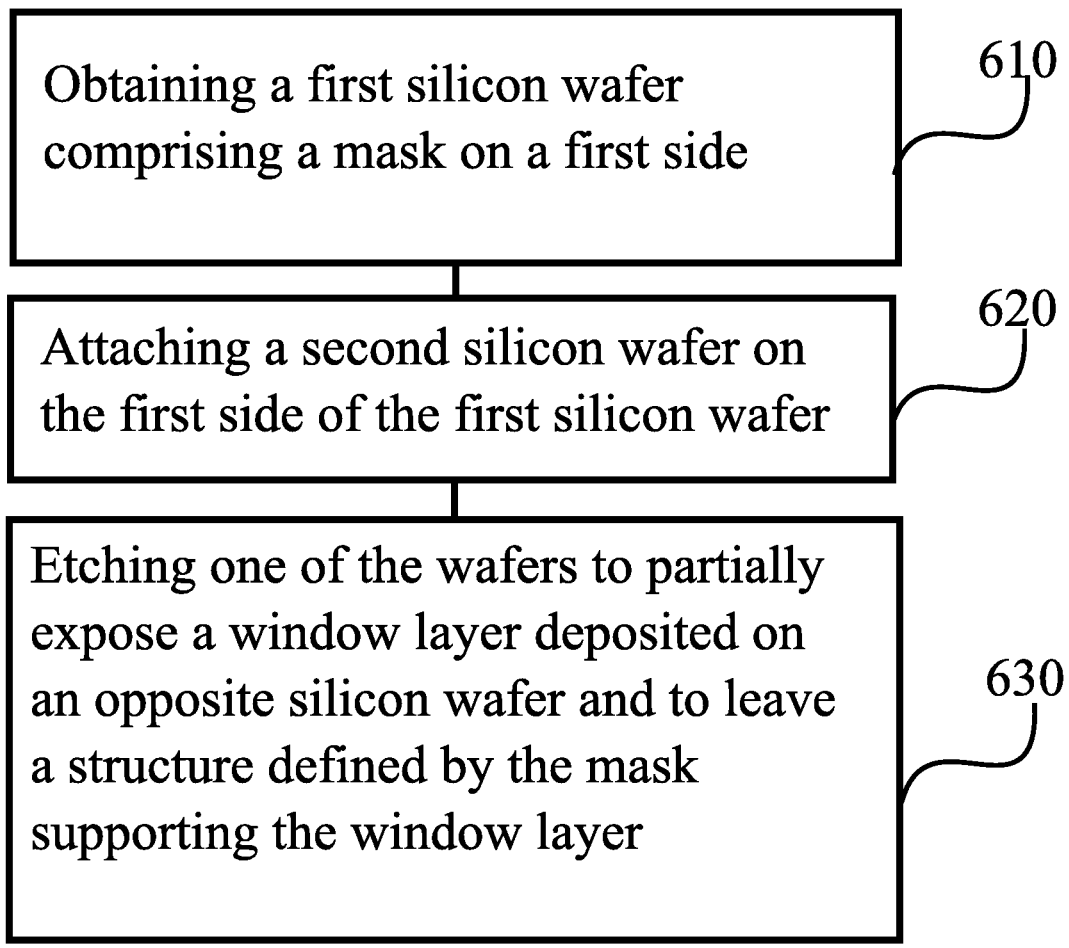
FIG. 6 is a flow graph of a method in accordance with at least some embodiments of the present invention.

FIG. 6 is a flow graph of a method in accordance with at least some embodiments of the present invention.

Phase 610 comprises obtaining a first silicon wafer comprising a mask on a first side. Phase 620 comprises attaching a second silicon wafer on the first side of the first silicon wafer. Finally, phase 630 comprises etching from a second side of the first silicon wafer to partially expose a silicon nitride layer deposited on the second silicon wafer and to leave a structure defined by the mask supporting the silicon nitride layer. The silicon nitride layer is deposited on a non attached side of the second silicon wafer, that is, a side not facing the first silicon wafer.

FIG. 7 is a flow graph of a method in accordance with at least some embodiments of the present invention.

Phase 710 comprises obtaining a first silicon wafer comprising a silicon oxide layer thereon, the silicon oxide layer comprising a cavity. Phase 720 comprises attaching a second silicon wafer on the first silicon wafer, the second silicon wafer having a silicon nitride layer deposited thereon, the silicon nitride layer thereby being inserted into the cavity. Finally, phase 730 comprises etching through the first silicon wafer to expose the silicon nitride layer, and etching through the second silicon wafer in accordance with a mask, to construct a support structure for the silicon nitride layer.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in measurement devices, such as soft x-ray measurement devices, for example.

Acronyms List

CCD charge-coupled device

REFERENCE SIGNS LIST

| | |
|---|---|
| 110 | Analytic device |
| 120 | X-ray detector |
| 115 | Window region |
| 115E | Window region, enlarged view |
| 117 | Window layer |
| 119 | Supporting structure |
| 130 | Sample |
| 140 | Primary x-ray source |
| 102, 103 | Primary x-rays, secondary x-rays |
| 210 | First silicon wafer |
| 212 | Second silicon oxide layer |
| 214 | First silicon oxide layer |
| 220 | Second silicon wafer |
| 222 | Window layer |
| 216 | Silicon nitride layer |
| 310 | Cavities |
| 320 | Remaining silicon |
| 410 | First silicon wafer |
| 420 | Second silicon wafer |
| 422 | Window layer |
| 412 | Second silicon oxide layer |
| 414 | First silicon oxide layer |
| 424 | Top silicon oxide layer |
| 510 | Silicon wafer |
| 512, 514 | Silicon oxide layer, SiO2 |
| 516 | Buried silicon oxide layer |
| 520 | Mask layer |
| 522 | Window layer |

The invention claimed is:

1. A method comprising:
obtaining a first silicon wafer;
attaching a second silicon wafer on a first side of the first silicon wafer leaving a mask between the first silicon wafer and the second silicon wafer, and etching from the side of the second silicon wafer which faces the first silicon wafer to partially expose a window layer deposited on the opposite side of the second silicon wafer and to leave a structure defined by the mask supporting the window layer.

2. The method according to claim 1, wherein the window layer is deposited on a non-attached side of the second silicon wafers.

3. The method according to claim 1, wherein the structure is formed of silicon of one of the silicon wafers.

4. The method according to claim 1, wherein the method further comprises removing the mask, at least partly.

5. The method according to claim 1, wherein the method further comprises depositing at least one surface layer on a side of the window layer that does not face the structure.

6. The method according to claim 5, wherein the at least one surface layer comprises an aluminium layer.

7. The method according to claim 5, wherein the at least one surface layer comprises a graphene layer.

8. The method according to claim 1, wherein before attaching the second silicon wafer, part of the silicon of the first silicon wafer is etched from the first side in accordance with the mask.

9. The method according to claim 1, wherein an etch stop layer is provided between the window layer and the second silicon wafer.

10. The method according to claim 9, wherein the etch stop layer is removed at least in part.

11. The method according to claim 1, wherein a third silicon wafer is provided, attached to the window layer, wherein a second mask is provided on the third silicon wafer, and wherein the third silicon wafer is etched in accordance with the second mask to produce a second structure on the window layer.

12. A radiation window structure, comprising:
a window layer, lying in a single plane, on a supporting structure, the supporting structure on a first but not a second side of the window layer,
wherein the window layer is partially covered by the supporting structure on the first side but is not covered by the supporting structure on a second side, and
wherein the supporting structure comprises first and second- silicon layers with a mask layer between the first and second silicon layers.

13. The radiation window structure of claim 12, wherein the mask layer covers parts of the second silicon layer on the first side not covered by the supporting structure.

14. The radiation window structure of claim 12, wherein the window layer is provided with at least one aluminium surface layer on the second side.

15. The radiation window structure of claim 12, wherein the window layer is provided with at least one graphene surface layer on the second side.

16. The radiation window structure of claim 12, wherein the mask layer has been removed from exposed parts of the second silicon layer on the first side.

17. The radiation window structure of claim 12, wherein the window layer is comprised of at least one material from the following list: silicon nitride, Al2O3, AlN, SiO2, SiC, TiO2, TiN, metallo-carbo-nitrides, graphene, pyrolytic carbon and polymer.

18. A method comprising:
obtaining a first silicon wafer comprising a silicon oxide layer thereon;
attaching a second silicon wafer on the first silicon wafer, the second silicon wafer having a window layer deposited thereon, the silicon oxide layer comprising a cavity and the window layer being inserted into the cavity as a result of the attaching, and etching through the first silicon wafer to expose the window layer, and etching through the second silicon wafer in accordance with a mask, to construct a support structure for the window layer.

19. The method of claim 18, wherein the etching through the second silicon wafer partly exposes the window layer.

20. The method according to claim 18, wherein the method further comprises depositing a surface layer on a side of the window layer.

21. The method according to claim 20, wherein the surface layer comprises an aluminium layer.

22. The method according to claim 20, wherein the surface layer comprises a graphene layer.

* * * * *